June 17, 1930. J. F. SCHYLANDER 1,764,056
LOCK
Filed Jan. 12, 1929
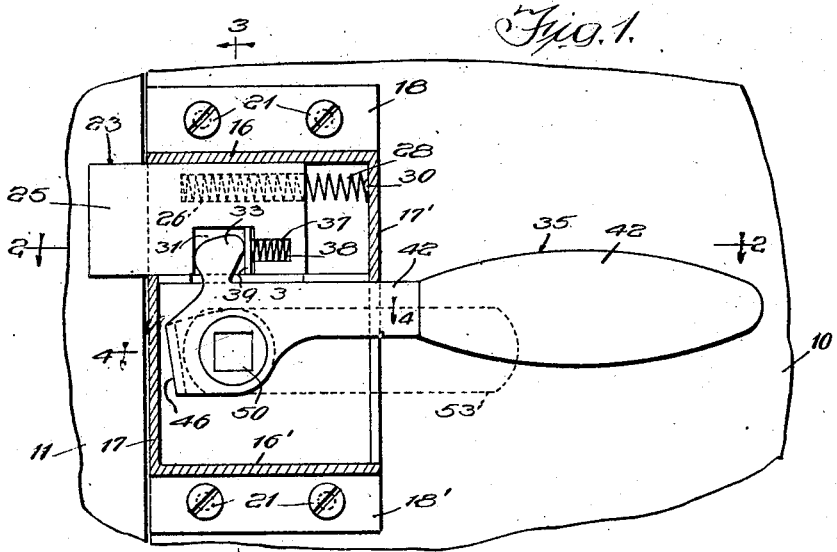
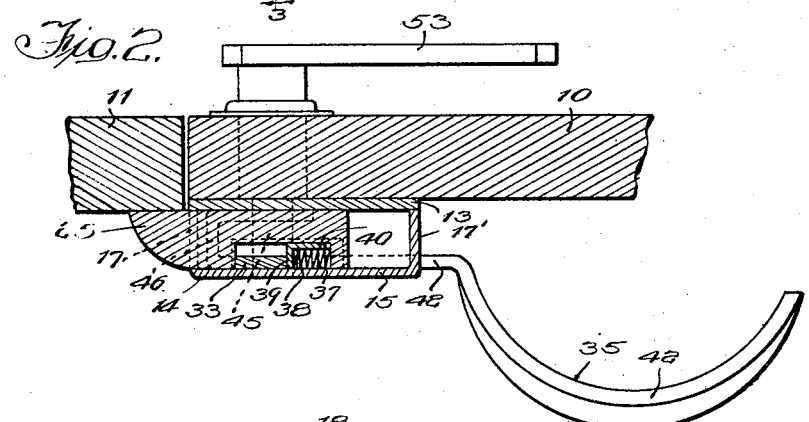
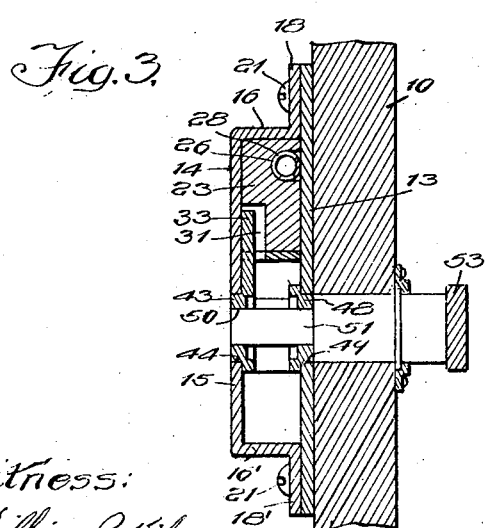
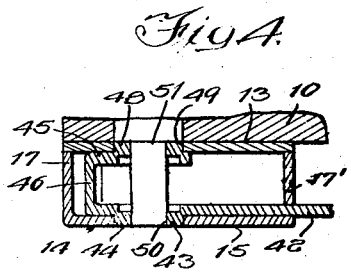
Inventor:
John F. Schylander
Hill & Hill
Attys
Witness:
William P. Kilroy Registered June 17, 1930

1,764,056

UNITED STATES PATENT OFFICE

JOHN F. SCHYLANDER, OF CHICAGO, ILLINOIS

LOCK

Application filed January 12, 1929. Serial No. 331,999.

My invention relates to locks and has to do more particularly with locking devices especially adapted to be mounted on a door of an automobile or other vehicle, and may be considered an improvement over the invention of my copending application Serial No. 310,777, filed October 6, 1928.

An object of my invention is to provide a device of the class described which will be particularly simple in construction, inexpensive to manufacture, certain in operation, and rugged.

Another object of my invention is to produce an article of the class referred to which may be made largely from a small number of relatively simple and inexpensive parts.

Still another object is to provide such a device wherein the relatively movable contacting parts will be prevented from rattling.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Referring now to the drawings forming a part of this specification and disclosing a preferred embodiment of my invention:

Fig. 1 represents an elevational view, partly in section, of a device embodying my invention mounted on an automobile door, the door and cooperating body portion of the automobile being shown fragmentarily;

Fig. 2 is a sectional view taken on the line 2—2 of Fig. 1;

Fig. 3 is a sectional view taken on the line 3—3 of Fig. 1; and

Fig. 4 is a sectional view taken on the line 4—4 of Fig. 1.

Devices embodying my invention may be made either right or left hand, as will be obvious to those skilled in the art. Hence, while only one form is shown, the other may be made by an obvious reversal of parts.

In the preferred embodiment disclosed, the numeral 10 indicates a door of an automobile or other vehicle cooperating with the body portion 11 of the vehicle. A plate 13 forming a part of the locking device is secured to a cooperating casing member 14, the casing member 14 being substantially rectangular, forming, in cooperation with the plate 13, a housing having the form of a rectangular parallelepiped. This casing member 14 comprises a wall 15 disposed in parallel relation to the plate 13, top and bottom walls 16 and 16', and side walls 17 and 17', the top, bottom and side walls being formed integrally with the wall 15. Outstanding flanges 18 and 18' are formed integrally with the top and bottom wall 16 and 16' and are adapted to be disposed against and parallel to the plate 13. The material of the flanges 18 and 18' is punched out, as shown in my copending application above referred to, to form annular members (not shown) which are swaged to apertures in the plate 13 so as to form substantially a unitary container, these apertures and annular members serving as seats for screws 21, or other suitable means, for securing the device to the door 10. If desired, solder may be placed between the edges of the casing and plate.

Slidably disposed within the container formed by the casing 14 and the plate 13 is a latch or striker bolt 23 having a curved beveled edge 25, as shown in Fig. 2. Except for the bevel above referred to, this bolt is substantially in the form of a rectangular parallelepiped and has a longitudinal cavity 26 formed on the face adjacent the plate 13. This cavity houses a helical compression spring 28, one end of this spring being secured to a boss 30 on the wall 17'. On the side of the bolt 23 adjacent the wall 15 of the casing member 14 is a slot 31 adapted to house a lug 33 of a manipulating member 35. Communicating with the slot 31 is a recess 37 which houses a helical compression spring 38. As shown in Figs. 1 and 2, a bearing plate 39 is provided for maintaining the lug 33 of the manipulating member snugly seated in the aperture 31. The bearing plate 39 has a cross portion 40 which is slidably seated in the recess 37.

The manipulating member 35 is in the form of a lever formed preferably of a single piece of metal, or the like, and comprises a curved handle portion 42 and an arm portion 42' having a circular boss 43 thereon disposed in a circular opening 44 of the wall 15, and an end portion 45 bent around as at 46 so that the end portion is substantially parallel to the arm portion 42. The end portion has a circular boss 48 formed thereon which is substantially similar to and aligned with the boss 43 and is seated in an aperture 49 of the plate 13. Thus, the bosses 43 and 48 serve as bearings for the rotation of the handle 35. Aligned apertures 50 and 51 are formed in the bosses, these apertures being rectangular in the particular embodiment shown, for the mounting of a handle member 53 on the other side of the door 10.

In the assembling of my device, it will be obvious that the striker bolt 23 is assembled in the casing member 14 with the spring 28 disposed in the cavity 26. The spring 38 is then placed in the recess 37 and retained therein by means of the member 40 and its integral bearing plate 39. The manipulating member 35 is then arranged with the boss 43 disposed in the aperture 44 and the lug 33 within the slot 31, this lug engaging the bearing plate 39. The plate 13 is then brought into place with the aperture 49 seating the boss 48, and the plate 13 and member 14 are then swaged together around the screw holes. The device is now in condition to be mounted on a door 10 and the handle 53 is secured on the opposite side thereof by suitable means.

It will readily be seen that my device is extremely simple in operation and construction. Rotation of the handle in a clockwise direction results in moving the lug 33 to the right, thus moving the striker bolt 23 in the same direction against the action of the spring 28 and thus the bolt is moved out of engagement with the wall of the vehicle and the door is free to be opened. The lug 33 is always maintained firmly in engagement with the wall of the cavity 31 by means of the bearing plate 39, which is resiliently urged against the lug 33 by the spring 38. This spring is adapted to retain its tension over very long periods of time. Obviously, as the bearing surfaces of the lug 33 wear down, the bearing plate 39 nevertheless maintains the lug snugly disposed in the aperture 31, so that the lock will never rattle even after long periods of usage but will always be smooth and substantially silent in operation.

Having thus described my invention, it is obvious that various immaterial modifications may be made in the same; hence I do not wish to be understood as limiting myself to the exact form, construction, arrangement and combination of parts herein shown and described, or uses mentioned.

What I claim as new and desire to secure by Letters Patent is:

1. In a device of the class described, a housing, a handle rotatably mounted in said housing, a latch slidable in said housing, means integral with said handle operatively engaging said latch, and means for maintaining said engaging means in contact with said latch so as to prevent rattling thereof, said last-named means comprising a follower and a coiled spring for urging said follower into contact with said engaging means.

2. In a device of the class described, a housing, a handle rotatably mounted in said housing, a slotted latch slidable in said housing, means integral with said handle and disposed in said slot for actuating said latch, said latch having a recess communicating with said slot, and a resilient member disposed within said recess and exerting pressure against said engaging means so as to maintain the latter snugly in contact with a wall of said slot.

3. In a device of the class described, a housing, a handle rotatably mounted in said housing, a slotted latch slidable in said housing, means integral with said handle and disposed in said slot for actuating said latch, said latch having a recess communicating with said slot, a resilient member disposed within said recess, and a bearing member disposed between said resilient member and said engaging means whereby the latter may be maintained in contact with a wall of said slot.

4. In a device of the class described, a housing, a handle rotatably mounted in said housing, a slotted latch slidable in said housing, means integral with said handle and disposed in said slot for actuating said latch, said latch having a recess communicating with said slot, a resilient member disposed within said recess, a bearing member disposed between said resilient member and said engaging means whereby the latter may be maintained in contact with a wall of said slot, and a member integral with said bearing member and slidably disposed in said recess for maintaining said bearing member at a predetermined angle with reference to said slot.

5. In a device of the class described, a housing a handle rotatably mounted in said housing, a slotted latch slidable in said housing, means resiliently urging said latch out of said housing, means integral with said handle and disposed in said slot for actuating said latch, said latch having a recess communicating with said slot, and a resilient member disposed entirely within said recess and exerting pressure against said engaging means so as to maintain the latter snugly in contact with a wall of said slot.

6. In a device of the class described, a housing, a handle rotatably mounted in said housing, a slotted latch slidable in said housing, means urging said latch out of said housing, means integral with said handle and disposed in said slot for actuating said latch, said latch having a recess communicating with said slot, a resilient member disposed within said recess, and a bearing member disposed between said resilient member and said engaging means whereby the latter may be maintained in contact with a wall of said slot.

7. In a device of the class described, a housing, a handle rotatably mounted in said housing, a slotted latch slidable in said housing, means resiliently urging said latch out of said housing, means integral with said handle and disposed in said slot for actuating said latch, said latch having a recess communicating with said slot, a resilient member disposed within said recess, a bearing member disposed between said resilient member and said engaging means whereby the latter may be maintained in contact with a wall of said slot, and a member integral with said bearing member and slidably disposed in said recess for maintaining said bearing member at a predetermined angle with reference to said slot.

In witness whereof, I hereunto subscribe my name this 2nd day of January A. D. 1929.

JOHN F. SCHYLANDER.